Oct. 12, 1926.
J. E. BODA
PLOW
Filed Feb. 9, 1922
1,603,018
5 Sheets-Sheet 1
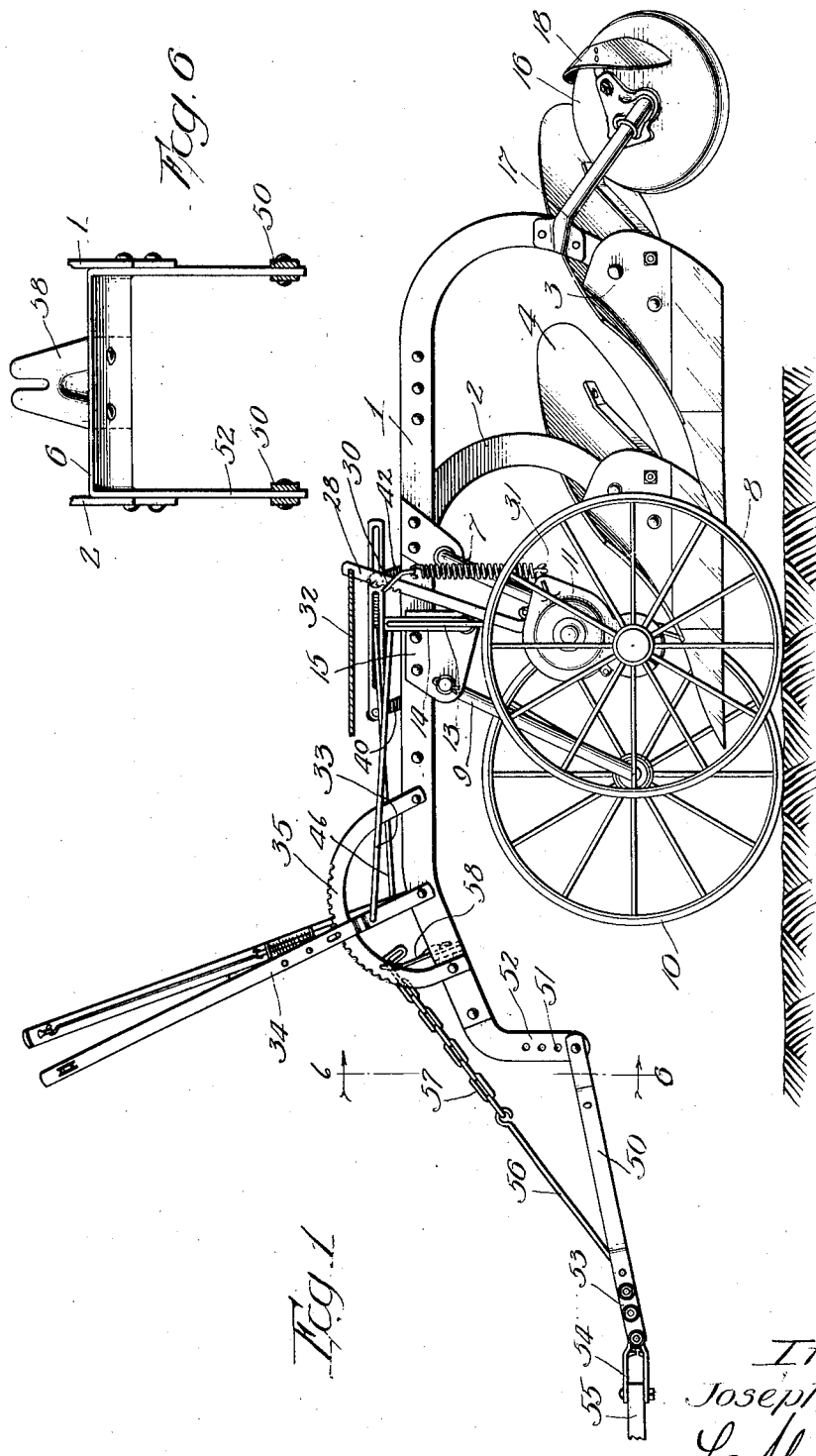
Inventor:
Joseph E. Boda
L.C. Shorts Atty Oct. 12, 1926. 1,603,018
J. E. BODA
PLOW
Filed Feb. 9, 1922 5 Sheets-Sheet 2
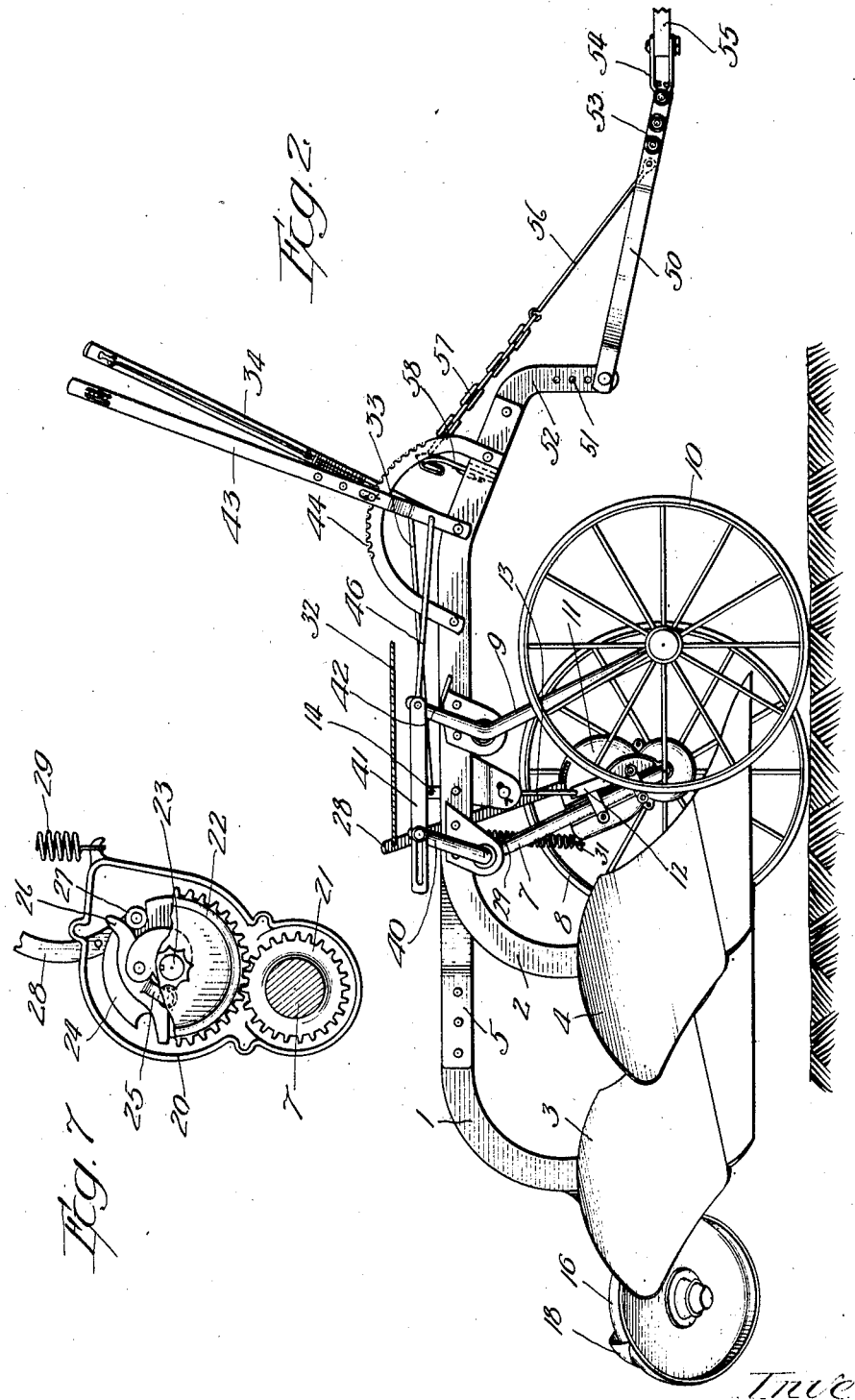

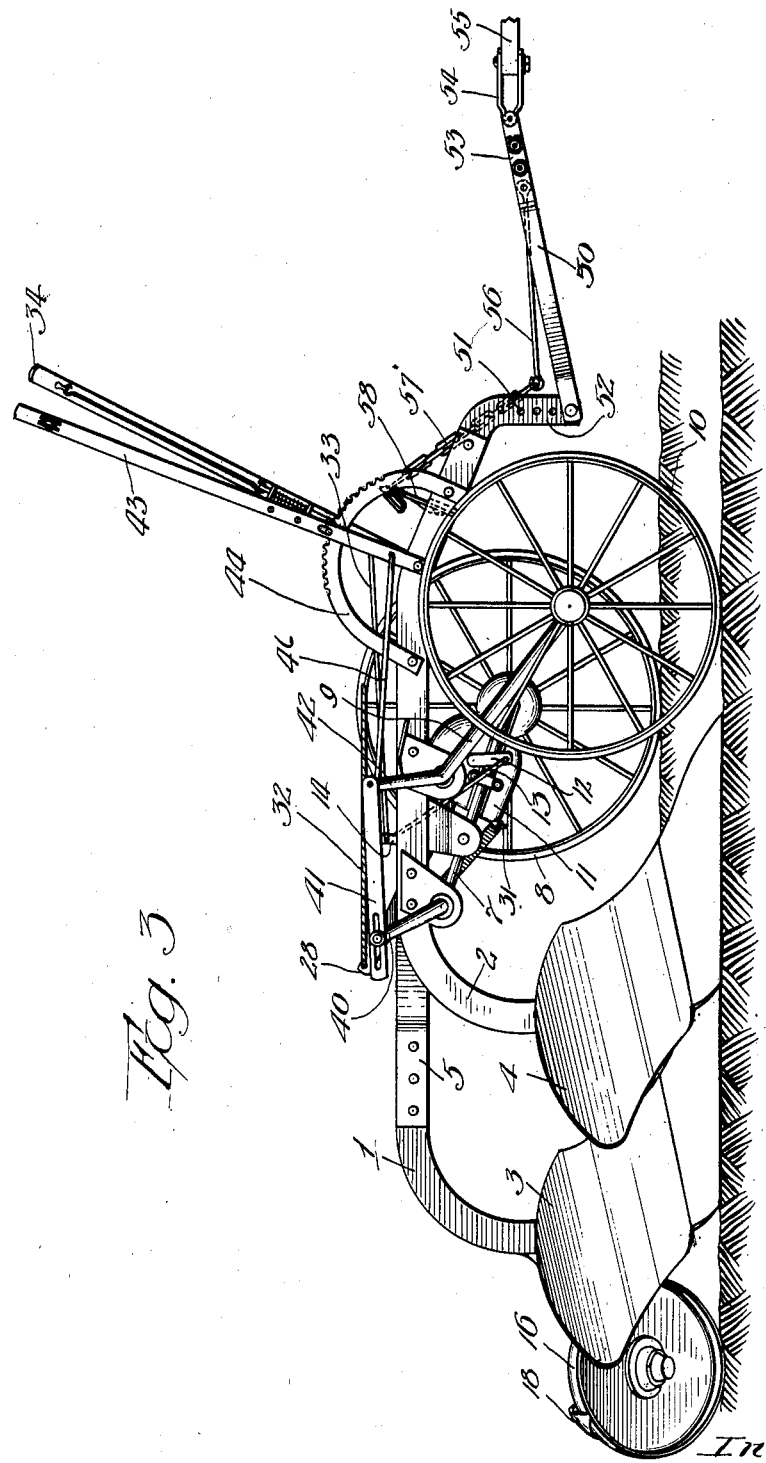

Oct. 12, 1926.
J. E. BODA
1,603,018
PLOW
Filed Feb. 9, 1922     5 Sheets-Sheet 4
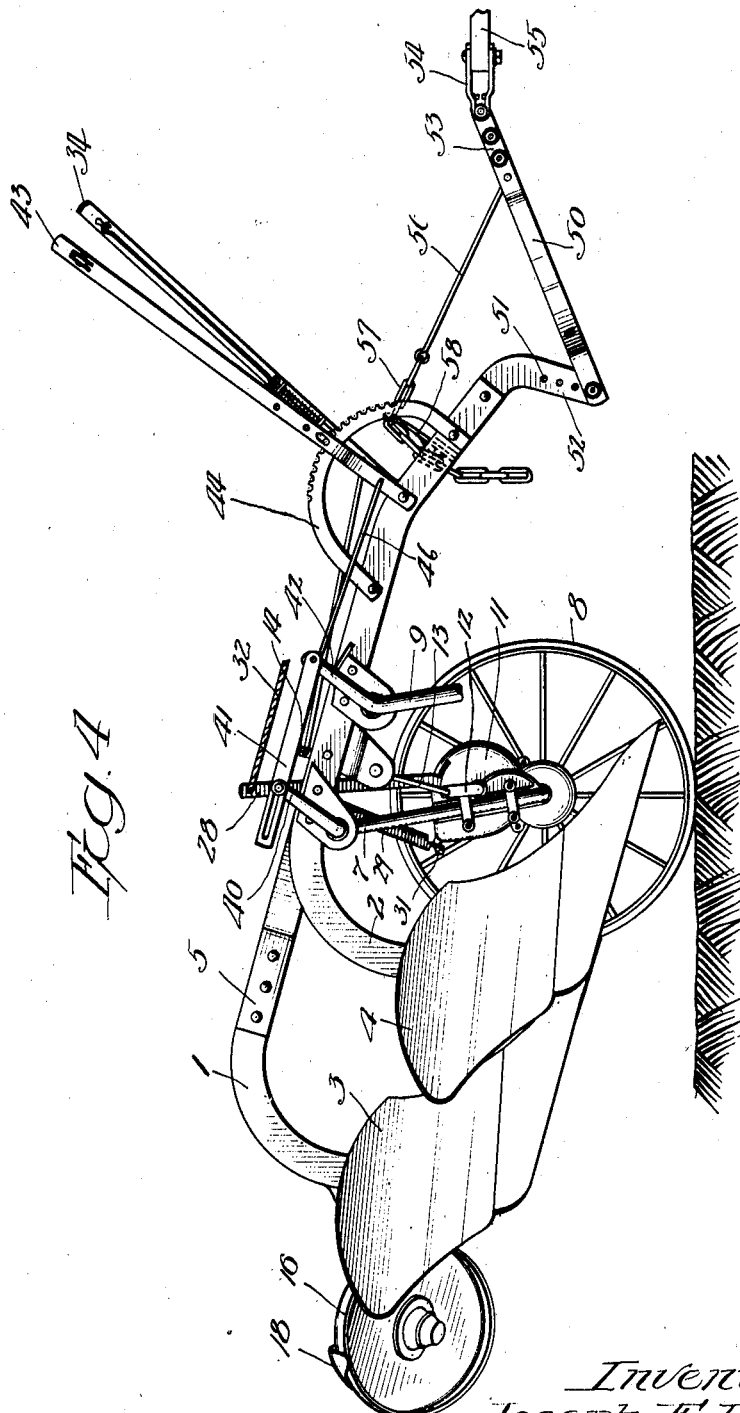
Inventor:
Joseph E. Boda
L.C. Shonts   Atty

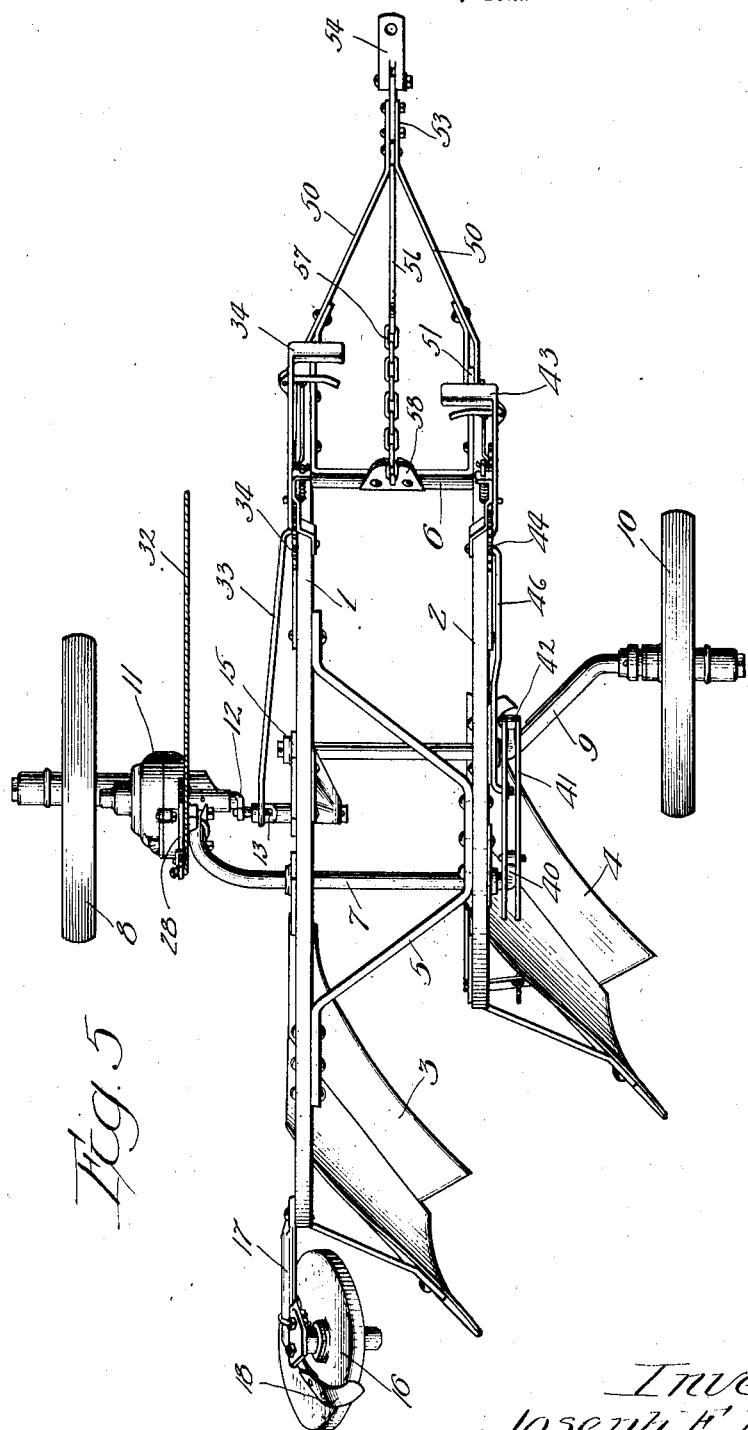

Patented Oct. 12, 1926.

1,603,018

UNITED STATES PATENT OFFICE.

JOSEPH E. BODA, OF MOLINE, ILLINOIS, ASSIGNOR, BY MESNE ASSIGNMENTS, TO MOLINE IMPLEMENT COMPANY, A CORPORATION OF ILLINOIS.

PLOW.

Application filed February 9, 1922. Serial No. 535,129.

The invention relates to plows.

The general object of the invention is to provide an improved plow construction.

The invention is illustrated as applied to a power-lift tractor plow of the frameless type, that is, a plow in which there is no distinct framework outside of the plow beams and the braces between them. There is a constant effort to simplify the construction of plows of this type to reduce their weight, to cheapen their cost of production, and at the same time increase their efficiency and durability. The present invention is directed toward these objects and the particular feature of this application is an improved hitch device which not only serves as draft connection, but performs the added function of holding the plow in position to permit easy access to the plow bodies for changing the shares.

Other objects and advantages of the invention will appear from the specification and drawings.

An embodiment of the invention is illustrated in the drawings in which:—

Figure 1 is a side elevation from the land side of the plow showing the plow bodies in raised position.

Figure 2 is a side elevation from the furrow side of the plow showing the plow bodies in raised position.

Figure 3 is a side elevation from the furrow side of the plow showing the plows in lowered position.

Figure 4 is a side elevation from the furrow side of the plow showing the plow bodies in a special position.

Figure 5 is a plan view.

Figure 6 is a detail end elevation of a portion of the plow construction.

Figure 7 is a side elevation and partial section of the clutch used in the lifting mechanism.

The plow includes parallel plow beams 1 and 2 carrying plow bodies 3 and 4 connected together at their rear by a brace 5 and at their front by a brace 6. These interconnected beams form a rigid framework which will hereinafter be referred to as the "frame" or beam structure, although this type of plow is usually known as a frameless plow, because there is no definite framework independent of the plow beams themselves.

The beam structure is carried by the crank axles of which the there two; a land wheel crank axle 7 pivoted to the beam structure and carrying a land wheel 8, and a furrow wheel crank axle 9 also pivoted to the beam structure and carrying a furrow wheel 10. These crank axles are swung relative to the beam structure by a powerlift mechanism including a clutch 11 which derives power from the land wheel and intermittently rotates a crank 12 connected by a link 13 to a crank 14 pivoted to a bearing 15 on the beam structure. When the crank is in the position shown in Figures 1 and 2, the plows are elevated and when it is in the position shown in Figure 3, the plows are lowered.

The side thrust on the plows is relieved from the landside by a rear furrow wheel 16 mounted on an arm 17 rigidly fastened to one of the plow beams. The wheel is disposed at an angle so that it rolls against the furrow wall taking the side thrust on a member whose resistance to forward movement is that of rolling friction rather than sliding friction, as would be the case if the landsides were depended upon entirely to absorb the side thrust. A scraper 18 is provided for automatically cleaning the furrow wheel.

The powerlift mechanism, partly illustrated in detail in Figure 7, is enclosed in a housing 20 that serves to keep out dust and dirt and to retain lubricant that is used to surround the rotating parts. Connected to the hub of the land wheel 8 is a gear 21 meshing with a gear 22 mounted loosely on the stub shaft 23. The gears 21 and 22 are rotated continuously with the land wheel. Keyed to the stub shaft 23 is a dog plate 24 carrying a dog 25 adapted to engage serrations on the inner surface of the continuously rotating gear 22. The dog 25 is normally biased into engagement with the rotating gear 22, but is held out of such engagement by reason of the fact that one of its ends 26 is held retracted by a roller 27 on the end of a trip lever 28, the latter being normally biased to the position shown in Figure 7 by means of a spring 29 adjustably connected by a link 30 to one end of the trip lever and to a hook 31 on the clutch housing. The trip lever 28 may be pulled to the left by means of a cord or cable 32 and, when so pulled, the roller 27 is retracted from behind the dog 26, thereby permitting the dog to be moved into engagement with the continuously rotating gear 22. The dog plate 24 together with shaft 23 is then rotated with the gear 22 until the roller 27 rolls off the edge of plate 24 into a second notch in the edge of said plate, whereupon the roller trips the dog 25 out of engagement with gear 22 causing the plate 24 and shaft 23 to stop. This movement is always in the same direction, the shaft 23 being rotated first from the position shown in Figures 1 and 2 to that shown in Figure 3, and then from the position shown in Figure 3 to that shown in Figures 1 and 2. The crank 12 is integral with stub shaft 23 so that rotation of the shaft moves the crank 12 from the position shown in Figure 2 to that shown in Figure 3, such movement serving to swing the land wheel crank axle relative to the framework. For a more detailed description of the power lift mechanism reference is made to Boda Patent No. 1,565,619, December 15, 1925.

The extent of the movement of the crank axle 23 may be varied by means of a link 33 connected to an adjusting lever 34 pivoted to the beam structure and cooperating with a toothed sector 35. If the lever 34 is adjusted when in the position shown in Figure 1, the effect on the mechanism will be very slight because, at that time, the link 14 is at the top of its arc relative to link 13 and movements of link 14 caused by adjustment of lever 34, do not raise or lower link 13 vertically to any noticeable extent. On the other hand, if the lever 34 is adjusted when the mechanism is in the position shown in Figure 3, the effect upon the crank axle will be marked because the link 14 is then at the side of its arc as related to link 13, and movements of link 14 by the adjusting lever 34 will impart a very considerable motion to link 13 thereby adjusting the land wheel crank axle up or down. An important advantage of this construction is that the plows will be always lifted to the same height above the ground regardless of their adjustment for depth because the link 14 will always be swung to one of its upper positions and all those upper positions retain the land wheel axle in approximately the same vertical position regardless of where the lever 34 may have been adjusted.

Movement of the land wheel crank axle is transmitted to the furrow wheel crank axle through connections that will now be described. The land wheel crank axle has on its end a crank 40 connected by a pin and slot connection to a link 41 that is in turn connected to a crank 42 on the furrow wheel crank axle. If the land wheel crank axle is swung clockwise from the position shown in Figure 3, that is, if it is swung to raise the plows, the crank 40 will first move in its pin and slot connection without moving link 41. This initial independent movement is for the purpose of permitting the land wheel crank axle to be started by the lifting mechanism without imposing on the lifting mechanism the task of moving both crank axles at once. However, as soon as movement of the land wheel crank axle has been started, the crank 40 will reach the end of the pin and slot connection, whereupon link 41 will be moved to the right and the furrow wheel crank axle will be swung in a clockwise direction. When the land wheel crank axle is swung in a counter-clockwise direction from the position shown in Figure 2, the crank 40 will move the pin and slot connection and will not impart a positive movement to the link 41, but the weight of the plows will cause the furrow wheel crank axle to swing counter-clockwise, which in turn causes the link 41 to follow the crank 40. The furrow wheel crank axle may be adjusted by means of a lever 43 pivoted to the beam structure and cooperating with a toothed sector 44, said lever being connected to the furrow wheel crank 42 by means of a link 46. This link is connected to the crank 42 by a pin and slot connection which permits the furrow wheel crank axle to move in a counter-clockwise direction as viewed in Figure 2 for every adjustment of the adjusting lever and the link, but whenever the crank axle is moved in a clockwise direction, its movement in that direction will be limited by the position of link 46.

The crank 42 on the furrow wheel crank axle is integral with the axle, such construction having advantages which are pointed out in detail in Henry Patent No. 1,575,427, March 2, 1926.

When the plow is lifted to the position shown in Figures 1 and 2, the entire rear end of the plow including the rear furrow wheel is lifted clear of the ground. The mounting of the structure on the crank axles is such that there is more weight to the rear of the crank axles than there is in front of them. This tends to cause the front end of the plows to tip upwardly, but such movement is prevented by means of an improved hitch device which is connected to the tractor that serves to pull the plow.

The hitch device includes draft bars 50 connected in any one of a plurality of holes 51 in the downwardly projecting ends 52 of the plow beams. These draft bars diverge rearwardly for connection to the plow beams and the front ends converging into a releasable hitch 53 connected to a clevis 54, that in turn, is connected to the draw bar 55 of a tractor. The draft bars are free to swing in a vertical plane about their pivots to the plow beams and they may be adjusted to vary the height of draft by being connected into any one of the holes 51.

Connected to the forward ends of the draft bars is a link 56 to which is connected a chain 57 arranged to be hooked in a catch 58 mounted on the front brace 6 between the plow beams. This catch is illustrated in detail in Figure 6. It comprises a bracket having a slot for the reception of the links of the chain 57, any one of which links may be positioned in the slot so that the effective length of the chain employed in the connection may be readily varied.

The position of the hitch device when the plows are in plowing position is illustrated in Figure 3. In that position, the link 56 with its chain 57 forms a loose connection which does not interfere with the vertical movements of the draft bars 50. Accordingly, the draft bars have the requisite freedom of movement necessary for a draft connection between a tractor and a plow. This movement must be sufficient to enable the tractor and plow to have a certain amount of relative movement to accommodate for inequalities in the surface of the ground.

When the power lift mechanism starts to raise the plow, the weight of the parts and the resistance of the ground causes the front end of the plow to be tipped upwardly. As this action takes place the hitch device assumes the position shown in Figures 1 and 2 in which chain 57 becomes taut. The front end of the draft bars cannot raise because they are connected to the tractor, and, since a rigid brace is formed by the draft bars 50 and the link 56 with its chain 57 connected to the beam structure, the front end of the plow is held against movement and any subsequent action of the raising mechanism lifts the rear end of the plow with the rear furrow wheel clear of the ground, in which position, the plow forms a two-wheel cart attached behind the tractor with all the plow mechanism clear of the ground.

A very important feature of this hitch device is that by depressing the forward ends of the beams to the position shown in Figure 4 and by then shortening the length of the chain 57, the plow may be held in the position illustrated in Figure 4 with the plow bodies elevated. This permits easy access to the plow bodies for the purpose of changing the plowshares which is an operation that must be performed frequently while plowing. When the front ends of the plow beams are pushed downwardly to the position illustrated, the plow rocks about the axes of the wheels as pivots. These wheels are not exactly in line so that the plow frame moves slightly forward and tips at a slight angle, but the action is so slight that it has not been considered necessary to illustrate it in detail as the drawing required would be quite complicated.

The advantage of this construction for practical operation is very marked. It is necessary to change the shares on the plow bodies from once every few hours to once every few days depending upon the character of the soil and several other factors affecting the wear on the share. The problem of getting at the plow bodies so as to remove the shares and replace them with new ones is always a difficult one and, in ordinary constructions, involves disconnecting the plow and lifting it into some position where the operator can get at the under side of the plow bodies. With the present construction, the plow can be quickly placed in the position where the plow bodies are accessible. For example, if the operator will get on the side of the plows opposite the near side in Figure 4 and then grasp the lever 34 he can, by simply pressing forward and down on this lever, tilt the plows in the position illustrated in Figure 4. He can do this with one hand because of the leverage available by reason of the location of the lever 34 leaving the other hand available for adjusting the chain 57. When he has done this, the plow is firmly locked in position and he can easily get at the plow bodies to remove the plowshares.

These important advantages are secured without adding any complicated parts to the hitch device. The same connection that serves to brace the hitch when the plows are normally raised, also serves to hold the plows in the position illustrated in Figure 4. The change in adjustment necessary to secure this added function is quickly and easily made and after the purpose for which the adjustment is made has been served, the device may be as easily readjusted to its initial position.

This application is a continuation in part of my prior application, Ser. #459,049, filed April 6, 1921.

It is to be understood that the structure shown is for purposes of illustration only and that variations may be made therein without departing from the spirit and scope of the invention as defined by the claims.

I claim:—

1. The combination in a tractor-drawn agricultural implement of a beam structure, a wheeled support therefor, means for raising the implement from working to transport position so that its front end tends to rise first, and a hitch device having draft bars pivoted to the forward end of the beam structure, said hitch including a bracing means connected at one end to the forward end of the hitch device and at the other end to the beam structure on a different horizontal plane than the pivots of the draft bars, said bracing means including elements which permit free vertical movement of the draft bars when the implement is in working position, but which act, as the implement is raised, to cause the bracing means to combine with the draft bars to form a brace to limit the upward movement of the forward end of the implement.

2. The combination in a tractor-drawn agricultural implement of a beam structure, a wheeled support therefor, means for raising the implement from working to transport position so that its front end tends to rise first, draft bars pivoted to the forward end of the beam structure on pivots spaced apart in substantially the same horizontal plane, and a bracing means connected at one end to the forward ends of the draft bars and at its other end to the beam structure on a different horizontal plane than the pivots of the draft bars, said bracing means including elements which permit free vertical movement of the draft bars when the implement is in working position but which act, as the implement is raised, to cause the bracing means in combination with the draft bars to form a brace to limit the upward movement of the forward end of the implement.

3. The combination in a tractor-drawn agricultural implement of a beam structure, a wheeled support therefor, means for raising the implement from working to transport position so that its front end tends to rise first, and a hitch device having draft bars pivoted to the forward end of the beam structure and adjustable vertically to vary the line of draft, said hitch device also including a bracing means connected at one end to the forward end of the hitch device and at its other end to the beam structure in a different horizontal plane than the pivots of the draft bars, said bracing means having a flexible portion which permits the draft bars to move vertically when the implement is in working position but which acts, as the implement is raised, to cause the bracing means in combination with the draft bars to form a brace to limit the upward movement of the forward end of the implement.

4. The combination in a tractor-drawn agricultural implement of a beam structure provided with two downwardly extending members at its forward end to provide low, spaced connections for draft bars, a wheeled support for the beam structure, means for raising the implement from working to transport position so that the front end of the beam structure tends to rise first, a pair of draft bars pivoted to the downwardly extending portions of the beam structure, and bracing means connected to the forward ends of the draft bars and extending rearwardly and upwardly and connected to the beam structure in a plane substantially above the plane of the pivots of the draft bars, said bracing means including portions which permit free vertical movement of the draft bars when the implement is in working position but which act, as the implement is raised, to cause the bracing means in combination with the draft bars to form a brace to limit the upward movement of the front end of the implement.

5. An agricultural implement having a beam structure, a wheeled support, means for raising and lowering the implement on the wheeled support, a hitch device connected to the forward end of the implement, and a bracing means connected at one end to the forward end of the draft bars and at its other end to the beam structure in a horizontal plane above the connections of the draft bars, said bracing means including a chain, the connection for one end of the bracing means comprising a plate having a slot for the reception of any one of the links of the chain whereby the effective length of the chain may be quickly and easily varied.

6. The combination in a frameless tractor plow of plow beams carrying plow bodies, crank axles and ground wheels for supporting the beams, means for swinging the crank axles to raise and lower the plow, said crank axles being positioned so that, as the plow is raised from working to transport position, the front end tends to rise first, and a hitch device adjustably connected to the front ends of the plow beams at points spaced apart in substantially the same horizontal plane, said hitch device having a bracing means connected at one end to the forward end of the hitch device and at its other end to the beam structure on a different horizontal plane than the first connections of the hitch device to said structure, said bracing means including portions which permit free vertical movement of the hitch device when the plow is in working position but which act with the other portions of the hitch device, as the plow is raised, to form a brace to limit the upward movement of the front end of the plow.

7. The combination in a frameless tractor plow of plow beams carrying plow bodies, crank axles and ground wheels for supporting the beams, means for swinging the crank axles to raise and lower the plow, said crank axles being positioned so that, as the plow is raised from working to transport position, the front end tends to rise first, draft bars pivoted to the forward ends of the plow beams at points spaced apart in substantially the same horizontal plane, and a bracing means connected to the forward ends of the draft bars and extending upwardly and rearwardly and connected to the plow beams at a point in a plane substantially above the pivots of the draft bars, said bracing means including a chain, one of the connections of said bracing means including a slotted plate for receiving the links of the chain.

8. The combination in a frameless tractor plow of a beam structure comprising a pair of parallel plow beams carrying plow bodies at their rear ends, said beams being connected together at their forward ends and having downwardly extending members to provide a low connection for draft bars, crank axles and ground wheels for supporting the beam structure, means for swinging the crank axles to raise and lower the plow, said crank axles being positioned so that, as the plow is raised from working to transport position, the front end tends to rise first, draft bars pivoted to the downwardly extending portions of the beam structure, said draft bars being connected together at their forward ends, a bracing means connected to the forward ends of the draft bars and extending upwardly and rearwardly, said bracing means including a chain, and a plate connected to the forward end of the beam structure at a point in a plane substantially above the plane of the pivots of the draft bars, said plate having a slot to receive the links of the chain.

9. The combination in a tractor-drawn agricultural implement of a beam structure, a wheeled support therefor, means for raising the implement from working to transport position so that the front end tends to rise first, a pair of draft bars pivoted to the forward end of the implement, said draft bars converging forwardly, a link pivoted to the converged ends of the draft bars, and a chain connected to the link and adjustably connected to the implement at a point in a horizontal plane above the connection of the draft bars.

10. The combination in a tractor-drawn agricultural implement of a beam structure, a wheeled support therefor, means for raising the implement from working to transport position so that the front end tends to rise first, a pair of draft bars pivoted to the forward end of the implement, said draft bars converging forwardly and being connected together and releasably connected to a draft member, a link pivoted between the forward ends of the bars where they are connected together, said link extending rearwardly and having a chain connected to it, and a catch plate supported by the forward end of the implement at a point in a horizontal plane above the plane of the pivots of the draft bars, said catch plate having a slot for receiving the links of the chain.

11. The combination in a tractor-drawn agricultural implement of a beam structure having a pair of spaced beams, a U-shaped cross brace connecting the forward ends of said beams with the arms of the U extending downwardly, a wheeled support for the beam structure, means for raising the implement from working to transport position so that its front end tends to rise first, draft bars pivoted to the arms of the U-shaped cross brace, bracing means connected to the forward ends of the draft bars and extending rearwardly and connected to the beam structure at a point in a plane substantially above the plane of the pivots of the draft bars, said bracing means including portions which permit free vertical movement of the draft bars when the implement is in working position but which act, as the implement is raised, to cause the bracing means to combine with the draft bars to form a brace to limit the upward movement of the front end of the implement.

12. The combination in a tractor-drawn agricultural implement of a beam structure having a pair of spaced beams, a U-shaped cross brace connecting the forward ends of the beams with the arms of the U extending downwardly, a wheeled support for the beam structure, means for raising the implement from working to transport position so that its front end tends to rise first, a pair of draft bars pivoted to the arms of the U-shaped cross brace, a link pivoted to the forward ends of the draft bars, a chain connected to the link, and a catch plate carried by the base of the U-shaped cross brace, said catch plate having a slot for receiving the links of the chain.

13. An agricultural implement having a beam structure carried by a wheeled support, a draft connection pivoted to the beam structure, and a bracing means connected at one end to the forward end of the draft connection and at the other end to the beam structure on a horizontal plane above the plane of the draft connection, said bracing means including a chain, one of the connections of the bracing means including a plate having a slot in which any one of the links of the chain may be hooked.

14. The combination in a tractor-drawn agricultural implement of a beam structure carrying agricultural tools at its rear end, a wheeled support for the beam structure, means for raising the implement from working to transport position so that the front end of the implement tends to rise first, draft bars connected to the forward end of the beam structure at points separated in substantially the same horizontal plane by vertically adjustable pivotal connections, and a bracing means connected to the draft bars and to the beam structure to combine with the draft bars to form a rigid brace to limit the upward movement of the forward end of the implement as it is raised, said bracing means including adjustable connections by means of which the bracing means may be used to hold the forward end of the implement down below its normal raised position when said forward end is moved down after it has been raised.

In testimony whereof, I affix my signature.

JOSEPH E. BODA.